United States Patent
Oppenheimer-Stix et al.

(10) Patent No.: US 6,855,766 B2
(45) Date of Patent: Feb. 15, 2005

(54) PROCESS FOR CONCENTRATING POLYMER LATEXES

(75) Inventors: Christiane Oppenheimer-Stix, Neuss (DE); Michael Traving, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 225 days.

(21) Appl. No.: 10/242,134

(22) Filed: Sep. 10, 2002

(65) Prior Publication Data

US 2003/0050383 A1 Mar. 13, 2003

(30) Foreign Application Priority Data

Sep. 13, 2001  (DE) ......................................... 101 45 097

(51) Int. Cl.[7] ............................................. C08L 31/00
(52) U.S. Cl. ..................... 524/832; 524/845; 524/846; 524/843
(58) Field of Search ................................ 524/832, 845, 524/846, 843, 494, 525, 558, 575.5

(56) References Cited

U.S. PATENT DOCUMENTS 5,225,084 A  *  7/1993  Assmann et al. ........... 210/649
5,242,596 A  *  9/1993  Bachem et al. ............. 210/644

FOREIGN PATENT DOCUMENTS

| DE | 43 05 547 | 8/1994 |
|----|-----------|--------|
| GB | 544449    | 4/1942 |

OTHER PUBLICATIONS

Houben–Weyl, vol. XIV/1, Makromol. Stoffe Part I, 4th edition, p. 515, (month unavailable) 1961, Hermann Hagemann and Dieter Klamann, 2.9 aus prim. "Nitro–alkanen (modifizierte NEF–Reaktion".

Polymer Colloids, Elsevier Applied Science Publishers, p. 272 (month unavailable) 1985, D.C. Blackley, "Concentration of Natural Rubber Latex".

Industrial and Engineering Chemistry, vol. 43, Feb. 1951, pp. 406–412, Ernst Schmidt and R.H. Kelsey, "Creaming Latex with Ammonium Alginate".

* cited by examiner

*Primary Examiner*—William K. Cheung
(74) *Attorney, Agent, or Firm*—Joseph C. Gil; Gary F. Matz

(57) ABSTRACT

The invention concerns a process for concentrating polymer latexes, which can be separated into a latex phase and a serum phase in a separator with the aid of an auxiliary coalescing device.

17 Claims, No Drawings

PROCESS FOR CONCENTRATING POLYMER LATEXES

FIELD OF THE INVENTION

The invention concerns a process for concentrating latex dispersions in a separator using auxiliary coalescing devices.

BACKGROUND OF THE INVENTION

Polymer-containing latexes, such as e.g. SBR (styrene-butadiene rubber) or NBR (acrylonitrile-butadiene rubber), polychloroprene, polybutadiene, polyisoprene, natural rubber latex, polyvinyl chloride, (meth)acrylate dispersions or dispersions of copolymers thereof, are conventionally available commercially in solids concentrations of over 45 to 50%. These concentrations can be achieved e.g. by increasing the concentration of low-concentration polymer latexes. The concentration of natural rubber latex is increased from 30% to 60% solids, for example.

Various methods of increasing the solids content are known in the prior art. In Houben-Weyl, Volume XIV/1, Makromol. Stoffe Part I, 4$^{th}$ edition, p. 515 (1961) or Polymer Colloids, Elsevier Applied Science Publishers, p. 272 (1985), for example, various possibilities are described, such as the addition of electrolytes, freezing out, evaporation of water, ultrafiltration, centrifugation or the addition of creaming agents.

These methods for increasing the solids content of polymer latexes are in some cases associated with considerable disadvantages, however. Thus, in the case of filtration, for example, there is always a risk that the pores of the filters will become blocked, resulting in an irreversible coagulate.

Centrifugation, which is used on an industrial scale for natural rubber latex in particular, is also problematic for synthetic latex as the particle sizes are often very much smaller than they are in natural latex. Another disadvantage of the centrifugation process is that the centrifuge can often be sealed only inadequately. This can cause air to be introduced into the aqueous phase, leading to foam formation, as a result of which throughput cannot be achieved in the desired order of magnitude.

Synthetic latex can be concentrated by creaming, for example. This is generally achieved by the addition of an aqueous solution of a creaming agent, for example sodium alginate, cellulose derivatives, methyl cellulose, agar-agar, gelatine, glue, pectin, salts of polyacrylic acid or by additional introduction of calcium acetate solution. It is also said that additions of ethylene oxide-containing non-ionic emulsifiers favour an increase in solids content.

Another important variable which is critical for the success of creaming and the creaming rate is the size of the latex particles. The larger the latex particles, the better the creaming process and the higher the latex solids content that can be achieved. In some circumstances it can therefore, be necessary to increase the size of the latex particles by pretreating them with e.g. NaCl solution.

The influence of particle size on the increase of the solids content is described for example in Ind. Eng. Chem., 43, 407 (1951). It emerged that a styrene-butadiene latex with a particle size of 78 nm could not be concentrated at all by addition of 0.1% ammonium alginate (relative to the aqueous phase), whereas a latex with a particle size of 360 nm could be concentrated very effectively.

Another important influencing variable is the ratio of creaming agent to latex quantity. If the ratio of creaming agent to latex quantity is too great, the latex is only thickened and the concentration process is slowed down. Too small a quantity of creaming agent on the other hand brings about no increase in solids content at all.

It is also said, for example, that the increase in solids content can be achieved by the addition of acids. In the case of latexes that have been stabilized by means of anionic emulsifiers, however, a shift to lower pH values increases the risk of the latex coagulating irreversibly. Such concentration processes are described for natural rubber latex, polystyrene-butadiene latex, polychloroprene latexes, copolymers of polyvinyl chloride and of polyvinylidene chloride.

In the case of polychloroprene latexes an increase in concentration from approx. 30% solids to 55% to 60% solids content has so far been achieved in industry by concentration with a creaming agent such as e.g. Na alginate. However, the rate of creaming varies enormously with the particle size. The smaller the particle size, the slower the concentration process, such that creaming times of up to 14 days arise with particle sizes below 100 nm.

SUMMARY OF THE INVENTION

Therefore, the object of the present invention was to provide a new process for increasing the solids content of polymer latexes, in particular for latex particle sizes below 100 nm. At the same time, the space-time yield for the creaming reaction should be significantly increased.

This object was achieved by adding a creaming agent to a polymer latex and separating the latex dispersion in a separator provided with an auxiliary coalescing device.

Auxiliary coalescing devices are used in the prior art to separate solvent mixtures in order to perform the separation in a separator according to the density of the individual phases.

The present invention provides a process for increasing the solids content of polymer latexes, characterised in that a latex dispersion is separated into latex and serum in a separator by means of an auxiliary coalescing device.

DETAILED DESCRIPTION OF THE INVENTION

During increase the solids content of the latex according to the present invention, the latex can be obtained as the lighter or heavier phase depending on the density of the dispersed polymer. Generally speaking, if polychloroprene latex is concentrated, the latex is heavier than the serum, whereas in the case of natural rubber latex the latex is lighter than the serum and must therefore be taken off at the top of the separator. The serum should consequently likewise be obtained as either the lighter or heavier phase.

According to the present invention, the serum should display a polymer content of less than 5%, preferably less than or equal to 2%.

The process according to the present invention for increasing the solids content of polymer latexes can be performed continuously or discontinuously, whereby a continuous procedure is preferred.

It is likewise possible for the process according to the present invention to be performed in a cascade arrangement in a cocurrent or countercurrent operation. This is preferred if the separation in a first separator stage is followed by a subsequent post-creaming of the thickened latex in a second concentration stage. The separation can optionally also be performed in a multistage process.

Internal recycling of the already concentrated solution is likewise possible. This enables the phase ratio, for example, to be varied to the effect that a faster phase separation occurs.

In the first step of the process according to the present invention the latex dispersion is mixed with the creaming agent and then introduced into the separator fitted with the auxiliary coalescing device. After a certain residence time in the separator, during which the latex dispersion can separate into two phases, the concentrated latex is drawn off as the lower or upper phase.

The phase separation can be influenced by varying the ratio of latex flow to flow of creaming agent solution.

The first step of the process according to the present invention takes place for example in a mixing tank or in a tubular-flow reactor, whereby the latex and the creaming agent are homogenized by means of a static mixer. This can also take place with any other devices known in the prior art, however, but care must be taken to ensure that the latex and creaming agent are thoroughly mixed together. Furthermore, possible foam formation due to the introduction of air must be prevented.

Suitable polymer latexes are all dispersions in which the solid is dispersed in a liquid phase and this phase in turn forms an emulsion with a further liquid phase. Examples are latexes of polymers consisting of dienes or olefinically unsaturated monomers and copolymers thereof, such as polystyrene-butadiene latex, polybutadiene latex, polyisoprene latex, natural rubber latex, acrylonitrile-butadiene latex, polychloroprene latex, polydichlorbutadiene latex, latex of a copolymer of chloroprene and dichlorobutadiene, polyisoprene latex, latex of chlorinated polyisoprene or (meth)acrylate latex. Dispersions of polyurethanes or other dispersions in which polymers are dispersed in water with the aid of emulsifiers or dispersing agents are also suitable, however.

Preferred polymer latexes are (meth)acrylate latexes, polychloroprene latexes, acrylonitrile-butadiene latexes, natural rubber latexes or latexes of copolymers thereof, whereby polychloroprene latexes and latexes of copolymers thereof are particularly preferred.

The concentration of polymer in the starting latex is between 20 and 45%, preferably between 20 and 40%.

Suitable creaming agents for the process according to the present invention are all creaming agents known in the prior art, such as e.g. alginates, cellulose derivatives, methyl cellulose, agar-agar, salts of poly(meth)acrylic acid, copolymers of alkyl(meth)acrylates and/or styrene with unsaturated sulfonic acid derivatives or olefinically unsaturated monobasic or polybasic carboxylic acids or salts thereof, salts of divalent ions, such as e.g. Ca acetate. Combinations of the various creaming agents cited above can also be used. Ethylene oxide-containing emulsifiers can optionally also additionally be used.

Alginates or cellulose derivatives are preferred.

The creaming agent is preferably used in the process according to the present invention as a dilute aqueous solution. The concentration of this solution is between 1 and 20 wt. %, preferably between 0.5 and 10 wt. %.

The proportions of latex and creaming agent can be varied but range from 0.1 to 5 wt. % creaming agent relative to the solids in the polymer dispersion, preferably from 0.5 to 5 wt. % creaming agent. The proportions should be optimized according to the creaming agent and latex used, however. This can be done by means of manual tests, for example, by adding different amounts of creaming agent solution to the latex and evaluating the mixture after 1 hour. The ideal ratio of creaming agent to latex can be identified by the fact that a good phase separation of thickened latex and serum is obtained and a post-creaming of the thickened latex in a second concentration stage is optionally, unnecessary.

The process according to the present invention delivers latexes with solids concentrations of 45 to 70%. 50 to 60% solids are preferred. The solids concentration of the serum should be as low as possible so that the entire polymer has gone over to the latex phase. The serum produced by the process according to the present invention preferably has a polymer content of less than or equal to 2%. The solids content of the serum mainly contains an emulsifier or dissolved salts and is less than 5%, preferably 1 to 4%.

In the process according to the present invention, the mixture of creaming agent and latex is passed through a separator fitted with an auxiliary coalescing device through which the latex mixture flows.

A suitable auxiliary coalescing device is a knitted fabric, for example. Suitable materials for the production of such knitted fabrics are all materials that can take the form of fibers, such as e.g.

plastics, such as polypropylene, polyethylene, polyvinyl chloride, polyvinylidene fluoride, polytetrafluoroethylene, glass fibers, such as staple glass fibers, glass silk, metals, such as all common stainless and acid-resistant steels, titanium, copper, aluminum, brass, galvanized steel, stainless steel.

Combinations of different materials, such as e.g. glass fiber/metal can also be used.

The choice of material should be governed by the mixture of creaming agent/latex used, since the choice of material depends on the wetting properties of the material system, especially of the disperse phase. Therefore, it is, likewise, possible for plasma-pretreated knitted fabrics to be used as a coalescing device in order selectively to influence the wetting properties.

Also suitable as auxiliary coalescing devices within the meaning of the process according to the present invention are microfiber beds in the form of candle filters. Suitable materials for these auxiliary coalescing devices are e.g. glass, stainless steel, Hastelloy, plastics such as polypropylene or polytetrafluoroethylene. Herein also, the material should be selected with regard to the system, as the wetting properties are likewise very important.

Preferred auxiliary coalescing devices are knitted fabrics or microfiber beds in the form of candle filters made from staple glass fibers/stainless steel polypropylene or polyester/stainless steel. Different auxiliary coalescing devices can also be used in the first and second separator stage. In the second stage, microfiber beds in the form of candle filters are preferably used.

The porosity of the knitted fabric can be between 90 and 99% preferably between 90 and 96%. The porosity P is defined by the general formula $$P=(\text{volume}_{total}-\text{volume of fibers})/\text{volume}_{total}$$

The volume of the knitted fabric compared to the volume of the separator should be calculated in such a way that the free volume of the separator is large enough to allow sufficient residence time for a possible post-separation. The volume of the auxiliary coalescing device is determined by means of the specific volumetric flow rate load, which can be obtained e.g. from the manufacturers of these auxiliary coalescing devices.

The separator vessel that is suitable for the process according to the present invention can be made from a wide variety of materials, for example from glass or steel, depending on corrosion properties and on the operating conditions of the system. A glass or steel separator vessel is preferred.

The dimensions of the separator vessel must be adjusted to the particular system to be used. For the process according to the present invention, the ratio of diameter to length of the separator vessel should be 2 to 10, preferably 3 to 7.

In order to assist the coalescence, it may optionally be necessary to shift the phase ratio towards a higher aqueous content by addition of e.g. creaming agent solution or water.

The process for increasing the solids content according to the present invention can be performed at room temperature, but it is also possible for it to be performed at higher or lower temperatures. The process should preferably be controlled in such a way that heat needs neither to be supplied nor eliminated.

The residence time of the polymer latexes in the separator depends on the specific loading of the coalescing device and on the viscosity of the two liquid phases. Times of 15 to 60 minutes, preferably 25 to 40 minutes, can be achieved in the case of knitted fabrics.

EXAMPLES

Example 1

According to the Present Invention

A polychloroprene latex was used, produced according to the prior art (e.g. in P. F. Johnson, Rubber Chem. Technol. 49, 1976, p. 665 ff) with a particle size of 97 nm (turbidity diameter according to H. Lange, Kolloid-Zeitschrift & Zeitschrift für Polymere, 223 (1968) 24–30). The solids concentration was 33%.

The apparatus for increasing the solids content contained receiver vessels for latex and creaming agent solution and a pump connected to each for metering the liquids into a stirred-tank reactor, where they were homogeneously mixed. From there, the blend was supplied to a glass separator fitted with a coalescing device (knitted fabric). The latex was taken off from the bottom of the separator, the serum from the top. The concentration of the aqueous creaming agent solution (Grindsted Alginate® FD 901, Danisco Ingredients, Denmark) was 1.5 wt. %. The knitted fabric contained staple glass fibers/stainless steel (RHO-280-SS/GSF-0.28/10 diameter 48×100, diameter of steel fiber=0.28 mm, diameter of staple glass fiber=0.1 mm (diameter of individual fibre= approx. 0.01 mm), manufactured by Rhodius GmbH, Treuchtlinger Straße 23, 91781 Weißenburg).

The length of the separator was 340 mm, the diameter 50 mm. The length of the knitted fabric was 100 mm.

The ratio of creaming agent solution to latex was 1:6.72. The temperature was 23° C. The volumetric flow rate of the latex was 500 ml, that of the alginate solution 75 ml. The concentrated latex had a solids content of approx. 52%, the serum had a solids content of approx. 3%. A post-separation of approx. 25 to 30 vol. % appeared in the thickened latex after 24 h.

Example 2

According to the Present Invention

The latex and creaming solution according to Example 1 were used. The reaction parameters likewise corresponded to those from Example 1.

The apparatus differed from that used in Example 1 in terms of a longer separator settling zone, which had been extended to 490 mm. The concentrated latex had a solids content of approx. 50%, the serum had a solids content of approx. 3%. A post-separation of approx. 1 to 2 vol. % appeared in the latex after 24 h.

Example 3

According to the Present Invention

The same latex and the same creaming solution were used as in Example 1. The reaction parameters were likewise the same as in Example 1.

The apparatus differed from that used in Example 1 in terms of a longer separator settling zone, which had been extended to 490 mm, and in terms of an extension of the coalescing device to 200 mm. The material of the knitted fabric was likewise changed. A combination knit containing stainless steel/polypropylene was used (RHO-SS/PP-0.28/ 0.22, diameter of steel fibre=0.28 mm, diameter of polypropylene fibre=0.22 mm double-thread, manufactured by Rhodius GmbH, Treuchtlinger Straße 23, 91781 Weißenburg).

It took approx. 5 h for a constant value for the solids content of the concentrated latex to become established. After 5 h it was 52%. The solids content of the serum was 2.5%. A post-separation of <1 vol. % appeared in the thickened latex after 24 h.

Comparative Example 4

90 m³ of the same latex as in Example 1 were placed in a 100 m³ tank and 11,054 kg of 1.8% aqueous alginate solution (Grindsted Alginate® FD 901, Danisco Ingredients, Denmark) were added with stirring. After 1 h, the stirrer was switched off and the latex allowed to stand at normal temperature. The concentration process was completed after 12 days. The thickened latex had a concentration of 55.6%. The solids content of the serum was 2.9%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for increasing the solids content of polymer latexes comprising the step of separating a latex dispersion into latex and serum in a separator by means of an auxiliary coalescing device, wherein the latex disoersion is mixed with a creaming agent comprising alginates or cellulose derivatives, and then introduced into the separator fitted with the auxiliary coalescing device, from which, a certain residence time, in which the latex dispersion can separate into two phases, the concentrated latex is drawn off.

2. A process according to claim 1, wherein the process is performed continuously.

3. A process for increasing the solids content of polymer latexes comprising the step of separating a latex dispersion into latex and serum in a separator by means of an auxiliary coalescing device, wherein the process is performed in a cascade arrangement in a cocurrent or countercurrent operation.

4. A process according to claim 3, wherein after separation in a first separator stage, an additional post-creaming of the thickened latex occurs in a second concentration stage.

5. A process according to claim 1, wherein said polymer latexes are (meth)acrylate latexes, polychloroprene latexes, polydichlorbutadiene-latexes, acrylonitrile-butadiene latexes, natural rubber latexes or latexes of copolymers thereof.

6. A process according to claim 1, wherein the creaming agent is an alginate or a cellulose derivative.

7. A process according to claim 1, wherein the auxiliary coalescing devices are knitted fabrics or microfiber beds in the form of candle filters.

8. A process according to claim 7, wherein the knitted fabrics or microfiber beds in the form of candle filters are made from staple glass fibers/stainless steel or polypropylene or polyester/stainless steel.

9. A process according to claim 1, wherein the residence time is from 15 to 60 minutes.

10. A process according to claim 1, wherein the process is performed in a cascade arrangement in a cocurrent or countercurrent operation.

11. A process according to claim 10, wherein after separation in a first separator stage, an additional post-creaming of the thickened latex occurs in a second concentration stage.

12. A process according to claim 3, wherein the latex dispersion is mixed with a creaming agent and then introduced into the separator fitted with the auxiliary coalescing device, from which, after a certain residence time, in which the latex dispersion can separate into two phases, the concentrated latex is drawn off.

13. A process according to claim 12, wherein the residence time is from 15 to 60 minutes.

14. A process according to claim 3, wherein said polymer latexes are (meth)acrylate latexes, polychloroprene latexes, polydichlorbutadiene-latexes, acrylonitrile-butadiene latexes, natural rubber latexes or latexes of copolymers thereof.

15. A process according to claim 12, wherein the creaming agents are alginates or cellulose derivatives.

16. A process according to claim 3, wherein the auxiliary coalescing devices are knitted fabrics or microfiber beds in the form of candle filters.

17. A process according to claim 16, wherein the knitted fabrics or microfiber beds in the form of candle filters are made from staple glass fibers/stainless steel or polypropylene or polyester/stainless steel.

* * * * *